United States Patent
Maichl et al.

(10) Patent No.: US 9,528,617 B2
(45) Date of Patent: Dec. 27, 2016

(54) PIEZOELECTRIC ACTUATED FLUID VALVE

(75) Inventors: Martin Maichl, Salach (DE); Hannes Wirtl, Schongau (DE); Andreas Dickhoff, Kirchheim/Teck (DE)

(73) Assignee: FESTO AG & CO. KG, Esslingen (DE)

( * ) Notice: Subject to any disclaimer, the term of this patent is extended or adjusted under 35 U.S.C. 154(b) by 244 days.

(21) Appl. No.: 14/122,485

(22) PCT Filed: Jul. 3, 2012

(86) PCT No.: PCT/EP2012/002788
§ 371 (c)(1),
(2), (4) Date: Jan. 10, 2014

(87) PCT Pub. No.: WO2013/013760
PCT Pub. Date: Jan. 31, 2013

(65) Prior Publication Data
US 2014/0182725 A1 Jul. 3, 2014

(30) Foreign Application Priority Data

Jul. 22, 2011 (EP) .................... 11006003

(51) Int. Cl.
*F16K 11/22* (2006.01)
*F16K 27/00* (2006.01)
(Continued)

(52) U.S. Cl.
CPC ........... *F16K 11/22* (2013.01); *F15B 13/0803* (2013.01); *F16K 27/003* (2013.01); *F15B 11/006* (2013.01);
(Continued)

(58) Field of Classification Search
CPC ..... F16K 11/22; F16K 27/003; F15B 13/0803; F15B 13/0839; F15B 2013/004; F15B 11/006; Y10T 137/87048
See application file for complete search history.

(56) References Cited

U.S. PATENT DOCUMENTS 4,861,232 A * 8/1989 Ise ........................... F04F 5/20
                                                      137/884
6,021,799 A * 2/2000 Price .................... B05B 7/1404
                                                      137/102
(Continued)

FOREIGN PATENT DOCUMENTS

DE    102008051837    4/2010
DE    102009010312    9/2010
(Continued)

OTHER PUBLICATIONS

Kosarzcecki C., "Flow Fundamentals Some Basics on Solenoid-Operated Directional Cartridge Valves", Hydraulics & Pneumatics, Aug. 2004, pp. 30-33, XP-00120076.

*Primary Examiner* — Marina Tietjen
*Assistant Examiner* — Daphne M Barry
(74) *Attorney, Agent, or Firm* — Hoffmann & Baron, LLP

(57) ABSTRACT

A valve device for influencing a fluid supply of fluid-operated loads, includes a valve module with a valve housing in which valve shafts are formed to accommodate valve cartridges, and further includes valve cartridges located in the valve shafts, wherein each of the valve shafts together with the valve cartridges accommodated therein bounds a pressure chamber connected to an assigned inlet port in a fluidically communicating manner, and wherein each of the valve cartridges includes two electrically selectable valve means which are designed to influence a free flow cross-section between the pressure chamber and an outlet port assigned to the respective valve means.

17 Claims, 11 Drawing Sheets

(51) Int. Cl.
*F15B 13/08* (2006.01)
*F15B 11/00* (2006.01)
*F15B 13/00* (2006.01)

(52) U.S. Cl.
CPC ...... *F15B 13/0839* (2013.01); *F15B 2013/004* (2013.01); *Y10T 137/87048* (2015.04)

(56) References Cited

U.S. PATENT DOCUMENTS

| | | | | |
|---|---|---|---|---|
| 6,499,509 | B2 * | 12/2002 | Berger | F15B 13/0438 |
| | | | | 137/596.17 |
| 6,929,019 | B2 * | 8/2005 | Weinmann | F16K 31/006 |
| | | | | 137/15.21 |
| 7,017,883 | B2 * | 3/2006 | Bayer | F16K 31/005 |
| | | | | 137/625.44 |
| 8,905,067 | B2 * | 12/2014 | Maichl | F16K 31/1221 |
| | | | | 137/554 |

FOREIGN PATENT DOCUMENTS

| | | |
|---|---|---|
| DE | 102009017877 | 10/2010 |
| WO | WO 2009/118029 | 10/2009 |

\* cited by examiner

PIEZOELECTRIC ACTUATED FLUID VALVE

This application claims priority based on an International Application filed under the Patent Cooperation Treaty, PCT/EP2012/002788, filed Jul. 3, 2012.

BACKGROUND OF THE INVENTION

The invention relates to a valve device for influencing a fluid supply of fluid-operated loads.

From DE 10 2009 017 877 A1, a valve device is known which comprises a plurality of valve modules lined up in a stacking direction. Each of the valve modules has a plate-shaped passage body with a feed passage recess and/or a vent passage recess, and each comprises four 2/2-way valves, each having a first and a second fluid port. The four 2/2-way valves are interconnected in a full-bridge arrangement. The four 2/2-way valves have an oblong cross-section in a cross-sectional plane parallel to a mounting surface, the main cross-sectional dimension being at least substantially perpendicular to the stacking direction. Furthermore, the main cross-sectional dimensions of the 2/2-way valves of a valve module are oriented coaxially with one another.

SUMMARY OF THE INVENTION

The invention is based on the problem of providing a valve device which, while having a simple structure, allows a fluid-operated load to be supplied with fluid with a minimum of delay.

For a valve device of the type referred to above, this problem is solved by the features of claim 1.

In the solution, it is provided that the valve device comprises a valve module with a valve housing in which valve shafts are formed to accommodate valve cartridges, and further comprises valve cartridges located in the valve shafts, wherein each of the valve shafts together with the valve cartridges accommodated therein bounds a pressure chamber connected to an assigned inlet port in a fluidically communicating manner, and wherein each of the valve cartridges comprises two electrically selectable valve means which are designed to influence a free flow cross-section between the pressure chamber and an outlet port assigned to the respective valve means.

In the illustrated embodiment, each of the valve shafts designed as recesses in the valve housing is designed to accommodate one valve cartridge and has a geometry which at least substantially corresponds to the external geometry of the valve cartridges. All of the valve cartridges of a valve device are preferably identical in their external geometry, so that the valve cartridges can be freely selected for installation into the respective valve shafts of the valve module. It is particularly advantageous if the valve cartridges have a constant, in particular rectangular, cross-section along a main dimensional axis. In this way, they can be inserted into the correspondingly shaped valve shafts. The valve cartridges are designed such that each bounds a pressure chamber with the valve shaft. As in the illustrated embodiment, the pressure chamber can be designed as a substantially rectangular volume, adjoining side walls of the pressure chamber being represented by the valve shaft. At least one end face of the pressure chamber is preferably represented by the installed valve cartridge. This results in a simple structure for the valve cartridge, because there is no need for a pressure-tight cartridge housing. On the contrary, it is sufficient if the valve cartridge seals the valve shaft in such a way that the required pressure chamber is formed by the combination of the valve cartridge with the valve module. According to the invention, the pressure chamber has an inlet port which is designed for fluidically communicating connection to a fluid, source or a fluid outlet. This being so, the inlet port can be used either for supplying a pressurised fluid to the pressure chamber or for discharging a pressurised fluid from the pressure chamber.

The pressure chamber is further assigned two outlet ports for fluidically communicating connection to fluid-operated loads, such as actuators. Each of the two outlet ports is assigned an electrically selectable valve means designed for influencing a free flow cross-section between the pressure chamber and the assigned outlet port. Using the valve means, the free flow cross-section between the pressure chamber and the outlet port can preferably be adjusted and switched between a blocking position and a release position. In the blocking position, a communicating connection between the pressure chamber and the outlet port is broken, while being completely open in the release position.

The valve means are selected by means of an electric control signal provided by a control unit which, as in the illustrated example, can be a part of the valve device or of the valve module, or which is alternatively provided away from the valve device. The control signal may be a DC or an AV voltage or a pulse width-modulated electric signal.

Advantageous further developments of the invention are specified in the dependent claims.

It is expedient if the valve means in the valve cartridge are movable, in particular pivotable, in a common movement plane between a blocking position and a release position for influencing the respective free flow cross-section to the associated outlet port. By the movable arrangement of the two valve means, a particularly compact design of the valve cartridge can be achieved. If the two valve means perform a linear movement between the blocking position and the release position, the movement axes for the two valve means are preferably oriented parallel to one another in the common movement plane. If the two valve means perform a pivoting movement between the blocking position and the release position, both pivoting planes are located in the common movement plane.

In a further development of the invention, an operating port which is formed on the valve housing and which is designed for a fluidically communicating connection to a fluid-operated load is connected in a fluidically communicating manner to an outlet port of a first valve cartridge and to an outlet port of a second valve cartridge for optionally establishing at the operating port a fluidically communicating connection to the pressure chamber of the first or the second valve cartridge. In this context, it may for example be provided that a first pressure chamber, which is defined by a combination of a first valve shaft and a valve cartridge accommodated therein, is set to a first fluidic pressure level and a second, correspondingly designed, pressure chamber is set to a second fluidic pressure level. By coupling an outlet port of the first pressure chamber to an outlet port of the second pressure chamber, the first or the second pressure level can optionally be made available at the operating port by suitable selection of the valve means assigned to the respective outlet ports. As each valve cartridge has two valve means and two outlet ports, two operating ports can advantageously be selected at the two pressure levels with two valve cartridges.

Each of the valve means preferably has a first end region located on the valve cartridge and a second end region which is freely movable, in particular pivotable, and which is designed for a sealing contact with a valve seat in the blocking position and for releasing the valve seat in the release position, wherein the valve seat is designed as a terminating orifice of an outlet passage which terminates into the pressure chamber and is connected to an outlet port. In such a configuration of the valve means, the desired pivoting movement is obtained by a curvature of the valve means, which is tongue-shaped in the illustrated embodiment. The firmly clamped end region remains stationary, while the freely movable end region of the valve means can be brought closer to or farther away from the valve seat by altering its radius of curvature. This curvature change can in particular be achieved by introducing an internal mechanical stress, which can be influenced by the applied electric control signal, into the valve means.

In a further variant of the invention, it is provided that the valve means are designed as piezoelectric bending transducers. The valve means is preferably a composite of a resiliently bendable substrate material, for example a metal strip, and a coating of a piezoelectric material applied thereto. The pivoting movement of the bending transducer is initiated by applying an electric voltage to the coating of piezoelectric material, which preferably contracts and thereby introduces the desired internal mechanical stress into the valve means. As a result, the latter changes its radius of curvature, resulting in a pivoting movement of the free end owing to the cantilevered arrangement of the valve means. This allows the pivoting movement of the respective valve means to be adjusted precisely by means of the electric control signal provided. The control signal is preferably a part of a control loop, so that the pivoting movement of the valve means and thus the free flow cross-section can be provided as required and matched to the fluid demand of the connected fluid-operated load.

At a distance from the first end region, the bending transducer preferably lies on an adjusting means which is supported on the valve cartridge and which is designed for setting a preferred position of the freely movable end region of the bending transducer in the movement plane. Using the adjusting means, manufacturing tolerances of the bending transducer and/or tolerances relating to its installation into the valve cartridge can be compensated, for example. By offering the opportunity for compensating manufacturing tolerances at a later date, the production requirements of the bending transducers and the requirements relating to their installation into the valve cartridge can be restricted to a cost-effective level. The adjusting means is designed for introducing a force into the bending transducer in the movement plane, which force is preferably oriented perpendicular to a surface located opposite the adjusting means, in particular perpendicular to a largest surface of the bending transducer, and which force is preferably directed from the adjusting means towards the bending transducer. This force, which acts at a distance from the clamping point of the bending transducer, can influence the curvature of the bending transducer in such a way that it adopts a presettable preferred position.

In a further development of the invention, the adjusting means has in the movement plane a curvature which can be adjusted for adjusting the preferred position of the freely movable end region of the bending transducer, in particular by local energy supply by means of an energy beam. The adjusting means of the illustrated embodiment is a material strip, in particular a metal strip, which is supported on the housing of the valve cartridge and on the bending transducer and therefore allows a force to be introduced into the bending transducer from the housing. At least a section of the adjusting means is curved, and the curvature can be changed by a plastic deformation of the adjusting means for adjusting the force acting on the bending transducer. This plastic deformation can for example be obtained by introducing a force directly into the adjusting means, or alternatively by local heating, in particular by means of an energy beam. Local heating can cause a change in internal material stresses and therefore the desired curvature change.

It is expedient if a spring means for providing a pressing force acting on the adjusting means in the movement plane is assigned to the bending, transducer. The spring means ensures a secure contact of the bending transducer on the adjusting means, so that the preferred position of the bending transducer can always be maintained irrespective of the position and/or the operating state of the valve cartridge. The spring means is preferably designed in the form of a leaf spring, in particular as a metal strip, and supported on the housing of the valve cartridge. In a particularly preferred variant, the spring means bears against a surface of the bending transducer which is opposite the adjusting means.

It is advantageous if the outlet ports are located on a front end face of the valve cartridge and/or if, adjacent to a rear end face of the valve cartridge, a continuous, in particular rubber-elastic, sealing element is formed for the sealed accommodation of the valve cartridge in the valve shaft. This facilitates' the installation of the valve cartridge into the valve module. In the illustrated embodiment, the outlet ports provided at the front end face of the valve cartridge are arranged on a front wall of the valve shaft while forming a seal in such a way that the fluid can in this region not escape from the pressure chamber between the valve cartridge and the valve module, but is exclusively discharged via the outlet ports. The valve shaft, which is designed for an installation of the valve cartridge by insertion along an installation axis, has along the installation axis a cross-section which is matched to the cross-section of the valve cartridge along the installation axis. The cross-sections of the valve cartridge and the valve shaft are preferably constant along the installation axis, may however alternatively be stepped. In any case, the pressure chamber is preferably bounded in an end region remote from the outlet ports by an end wall of the valve cartridge, which can be sealed and located in the valve shaft by means of the continuous sealing element.

In a further variant of the invention, a contact device which is designed for an electric connection between the electrically selectable valve means and, a selection circuit which is in particular designed for configuration in a bus system as a bus subscriber is located on a rear end face of the valve cartridge. In accordance with the illustrated embodiment, this contact device may be a printed circuit board with conductor paths serving as contact surfaces mounted thereon, or a plastic part in MID (moulded interconnect device) technology, wherein electrically conductive areas are applied to the plastic part in an injection moulding process, or else metal pins projecting from the end face of the valve cartridge. The contact device ensures the power supply of the two valve means in the valve cartridge. Sensor means provided in the valve cartridge, if applicable, can also be supplied with electric energy via the contact device and scanned for their sensor signals. The selection circuit can either be located directly in the rear end region of the valve cartridge or is preferably provided for a selection of several valve devices. The selection circuit can preferably be configured as a bus subscriber in a bus system, for example in a field bus system in which data transmission between a higher-order control unit or machine controller and the selection circuit is provided in accordance with a presettable bus protocol.

Two each of the valve cartridges are preferably fluidically connected to form two 3/3-way valves. In this way, an advantageous functionality can be obtained for the valve cartridges and the valve module with a minimum of constructive effort. All that is required for providing the two 3/3-way valves is two pressure chambers which are bounded by the respective valve cartridges together with the valve module. Regarding the valve means, the valve cartridges have a uniform structure, which likewise results in a simpler structure and in cost-effective production.

The valve device preferably comprises a main valve module having at least one fluidically selectable main valve which comprises a valve member accommodated in a valve chamber and an actuator coupled to the valve member and movably accommodated in a pilot chamber, wherein the pilot chamber is connected to an operating port of the valve module and a position of the actuator and the valve member coupled thereto is adjustable as a function of a pressure applied to the pilot chamber, in order to adjust a free flow cross-section in the valve chamber by means of the valve member. In this configuration of the valve device, the valve module is used for the fluidic selection of the associated main valves, which are in turn designed to influence a free flow cross-section through the respective valve chamber. The valve member of the main valve is preferably movable between a blocking position and a release position for the valve chamber, in order to effect either a complete blocking of the free flow cross-section through the valve chamber or a partial or complete opening of the free flow cross-section. The valve member of the main valve is coupled to an actuator, being in particular integrated therewith, the actuator serving the purpose of introducing a force into the valve member in order to cause its movement. The force introduced is provided by the fluid which is made available by the valve device via the operating port to the pilot chamber in which the actuator is movably accommodated. The actuator is preferably designed in the form of an operating piston which introduces a force depending on the pressure of the available fluid into the valve member.

It is expedient if a spring device is assigned to the valve member and/or to the actuator in order to provide a spring force for determining a preferred position of the valve member in the valve chamber. In this case, a pressurised fluid only has to be made available in the pilot chamber if a movement of the valve member out of its preferred position is desired.

In a further variant of the invention, it is provided that one valve module and one main valve module each form a valve unit which can be lined up along a line-up axis with an adjacent valve unit with its largest outer surface, wherein at least one recess extending along the line-up axis passes through the valve unit to form a fluid passage. This allows a plurality of valve units to be assembled by simple means to form a compact valve assembly in which a central supply and/or discharge of fluid is/are provided through the at least one fluid passage extending along the line-up axis. The valve units are preferably rectangular, wherein narrow sides which adjoin one another have a smaller width dimension than the side surfaces formed as the largest surfaces and located opposite one another. The edge length of the side surfaces may for example be greater by a factor of 5 to 10 than the width of the four narrow sides, which are oriented perpendicular to one another.

It is advantageous if at least one contact means designed for an electric connection of the valve module and/or the main valve module to an electronic selection circuit and/or to an electronic control unit projects at a narrow side of the valve unit. By arranging the contact means on the narrow side of the respective valve unit; the selection circuit provided for a signal transmission between the electronic control unit and the valve means can, in a first embodiment of the valve device, be formed outside the valve unit and nevertheless access the respective valve means directly along a short path. As a result, a structural separation is advantageously obtained between the electrically selectable valve means and the selection circuit, so that the selection circuit can, if faulty, be replaced quickly, or so that the functionality of the respective valve unit can be changed by replacing the selection circuit and/or the device can be adapted to the different requirements of different control units. In a second embodiment of the valve device, the selection circuit is integrated into the valve unit and connected to the electronic control unit via the contact means. In this case, there is no need for a long electric transmission path between the control unit and the selection circuit, because the selection circuit, being integrated into the valve unit, can be brought into direct electric contact with the control unit via the contact means. Generally speaking, as a result of the laterally projecting contact means, the number of electric connection points between the valve means and the control unit is significantly lower than in known valve devices, in which an electric signal transmission is provided along a line-up axis for the valve units and the signals have to be looped through each of the valve units; this has a positive effect on the reliability and on the speed of the signal transmission between the control unit and the valve means.

BRIEF DESCRIPTION OF THE DRAWINGS

An advantageous embodiment of the invention is illustrated in the drawing, of which.

DETAILED DESCRIPTION OF THE PREFERRED EMBODIMENTS

Figure 1:
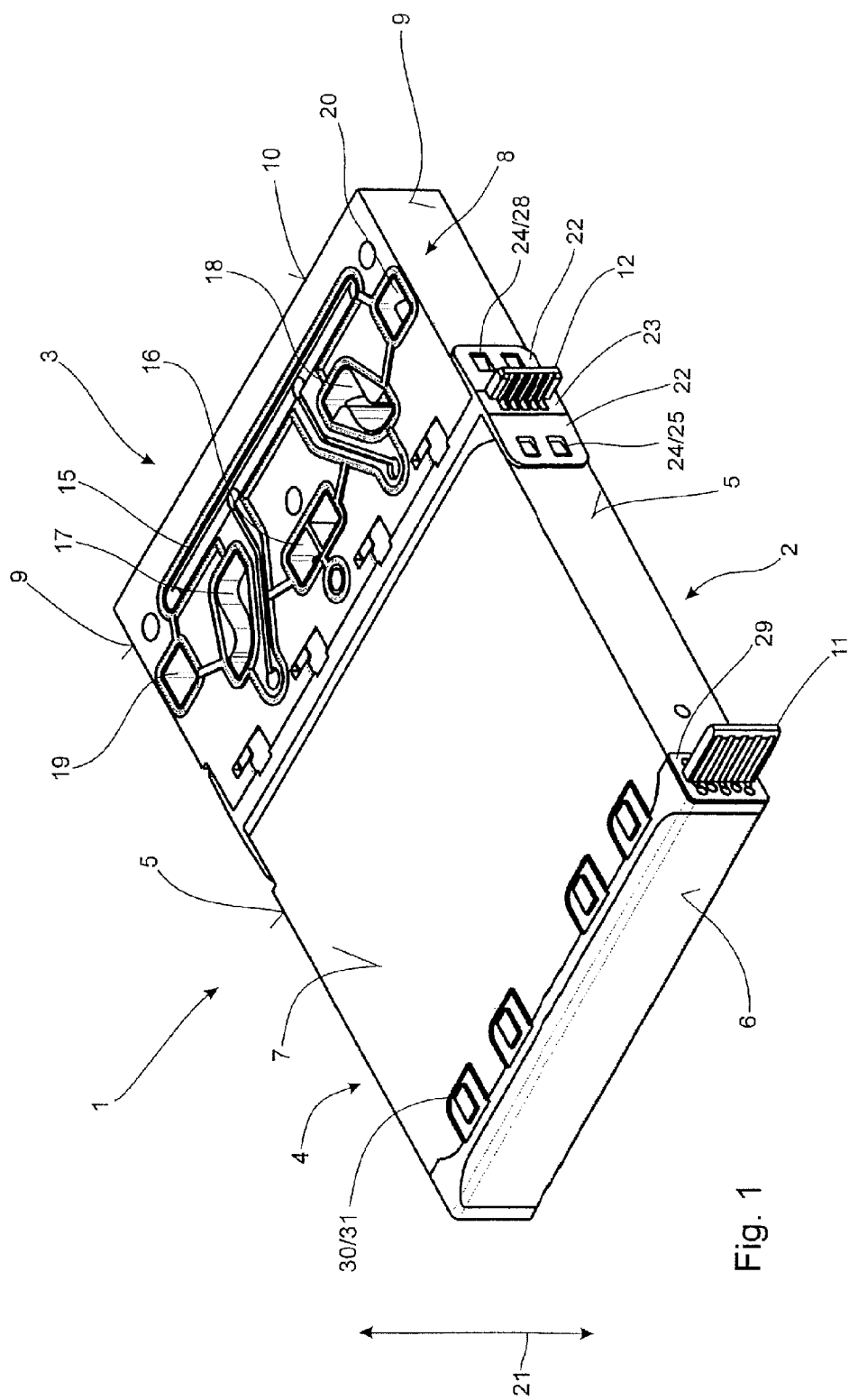
FIG. 1 is a perspective view of a valve device.

FIG. 1 shows a valve unit 1 which can be provided as a part of a valve device not shown in detail. The valve unit 1 comprises a valve module 2 and a main valve module 3 connected thereto. The valve module 2, the structure of which will be described in greater detail later, comprises a valve housing 4, which is rectangular in the illustrated embodiment. A shorter edge length of narrow sides 5, 6 of the valve housing 4 is considerably less than one of the edge lengths of a rectangular side surface 7. The valve unit 1 has two opposite side surfaces 7, of which only one is visible in FIG. 1 because of the chosen perspective. The side surfaces 7 are provided for surface contact with side surfaces of adjacent valve units not shown in the drawing, so that a valve device can be created by lining up several valve units 1.

The main valve module 3, the structure of which will likewise be described in greater detail later, comprises a main valve housing 8, which is rectangular in the illustrated embodiment. A shorter edge length of narrow sides 9, 10 is matched to the shorter edge length of the narrow sides 5, 6 of the valve housing 4. At right angles to the lateral narrow sides 5 and 9 of the valve housing 4, contact means designed as tab connectors 11, 12 project, the tab connector 11 being electrically assigned to the valve module 2 and the tab connector 12 being electrically assigned to the main valve module 3. The main valve housing 8 has several recesses 15, 16, 17, 18, 19, 20, of which some completely pass through the main valve housing 8 along a line-up axis 21 in order to form fluid passages passing through several or all of the valve units 1 of a valve device not shown in the drawing. In the illustrated embodiment, the fluid passages formed by the recesses 15 to 20 are used to provide a pressurised fluid for the valve modules 2 and/or the main valve modules 3 or to discharge fluid from the valve modules 2 or the main valve modules 3.

The valve module 2 is joined to the main valve module 3 by elastic locking tabs 22 which are formed on a connecting part 23 located between the valve module 2 and the main valve module 3. The locking tabs 22 have recesses 24 which are matched to locking projections 25, 28 on the valve module 2 and the main valve module 3 and which are designed for positive coupling to the locking projections 25, 28. In addition to mechanically coupling the main valve module 3 to the valve module 2, the connecting part 23 also electrically couples sensor means of the main valve module 3, which will be described in greater detail at a later point, to a selection circuit not shown in detail, providing the tab connector 12 required for this purpose. The connecting part 23 is preferably designed as an injection-moulded plastic part with integral locking tabs 22. In a particularly preferred embodiment, the electric connections at the connecting part 21 are produced using MID (moulded interconnect device) technology, i.e. produced in the connecting part 23 by injection moulding.

On the narrow side 6 of the valve module 2 which is remote from the main valve module 3, a further connecting part 29 is located, which is provided for electrically coupling the valve means accommodated in the valve housing 4 to the selection circuit not shown in the drawing and which provides the tab connector 11 required for this purpose. The connecting part 29 has locking tabs 30 which are provided for locking at the valve housing 4, which is provided with suitably designed locking projections 31 for this purpose. The connecting part 29 is preferably designed as an injection-moulded plastic part with integral locking tabs 30. In a particularly preferred embodiment, the electric connections at the connecting part 29 are produced using MID (moulded interconnect device) technology, i.e. produced in the connecting part 29 by injection moulding.

Figure 2:
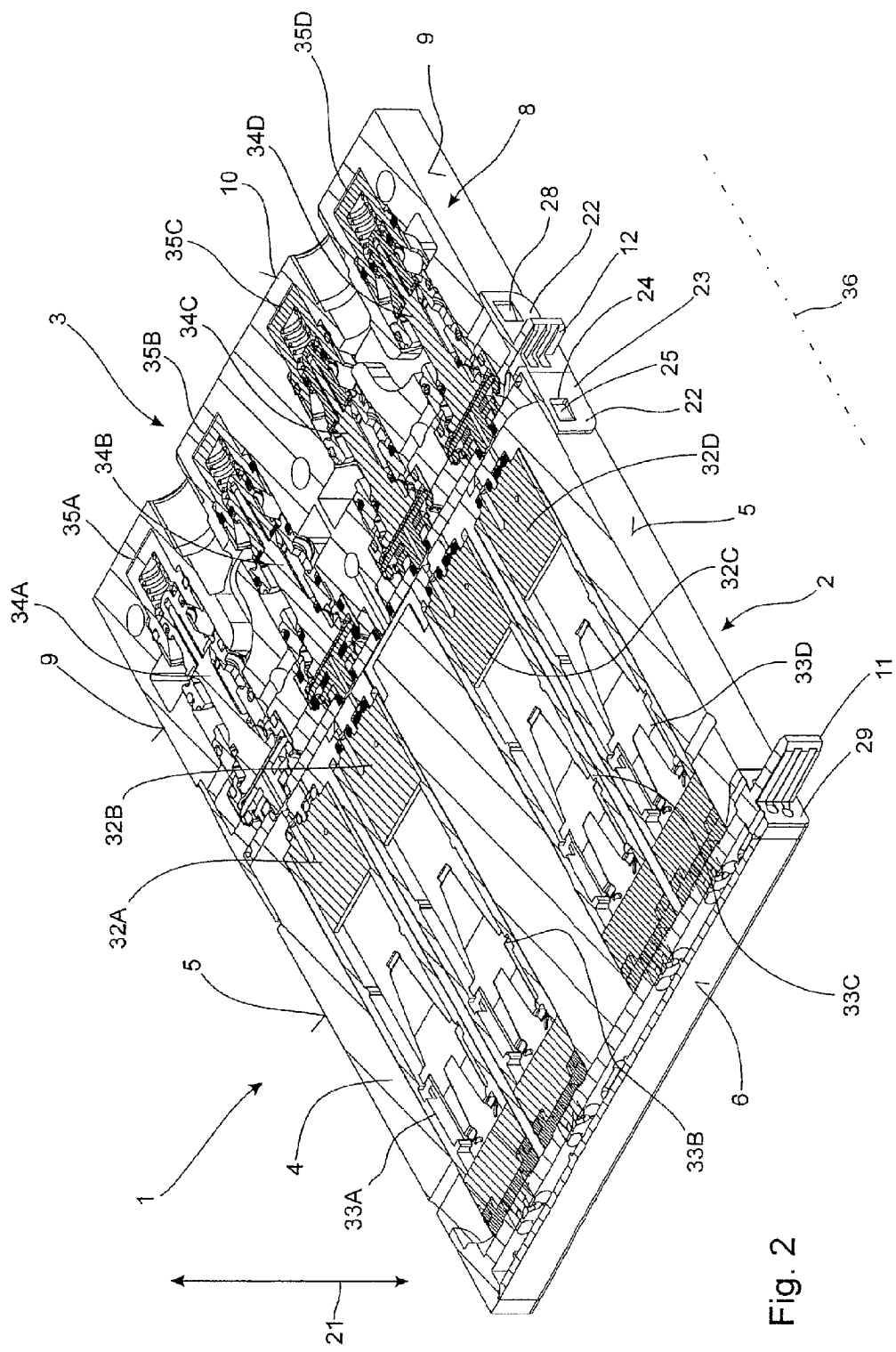
FIG. 2 is a perspective sectional view of the valve device according to FIG. 1.

The sectional view of FIG. 2 shows the structure of the valve module 2 and the main valve module 3 in greater detail. In the illustrated embodiment, four valve cartridges 32 are accommodated in valve shafts 33 of the valve housing 4. The valve housing 4 and the valve cartridges 32 accommodated therein will be described in greater detail below with reference to FIGS. 5 to 9.

In the main valve housing 8 of the illustrated embodiment, four main valve bodies 34 are slidably accommodated in valve recesses 35. The main valve housing 8 and the main valve bodies 34 accommodated therein will be described in greater detail below with reference to FIG. 11.

Figure 3:
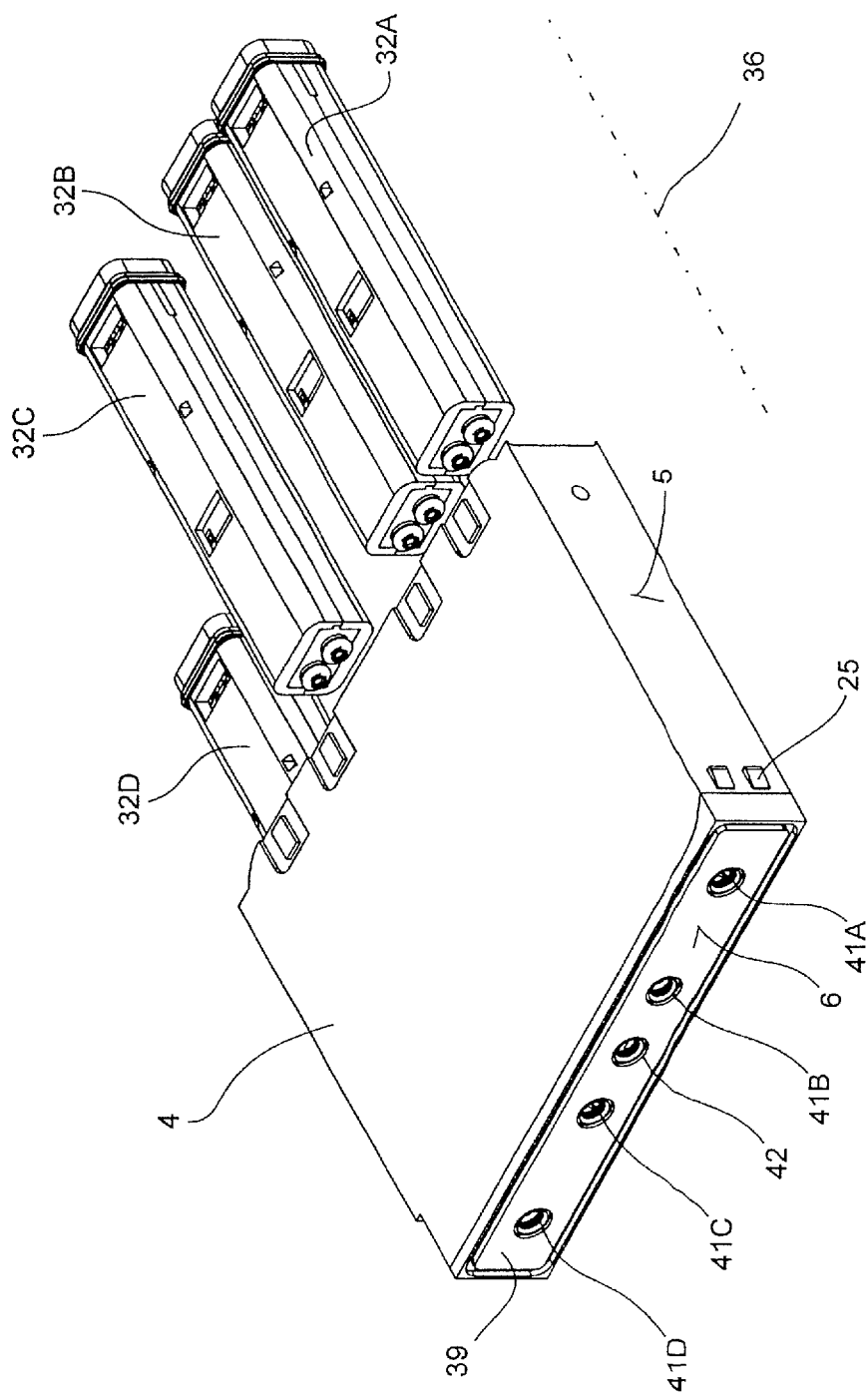
FIG. 3 is a perspective sectional view of a valve housing and the valve, cartridges accommodated therein.

FIG. 3 shows that the valve cartridges 32, which can be identified as valve cartridges 32A, 32B, 32C and 32D if required, are rectangular in the illustrated embodiment. As a result, the valve cartridges 32 can be installed into the valve shafts 33, which can be identified as valve shafts 33A, 33B, 33C and 33D if required and which can be seen in FIG. 2, by inserting them along an installation axis 36. The valve shafts 32 pass through the valve housing 4 along the installation axis 36 and are at their narrow side 6, which is provided for contact with the connecting part 23, sealed by an end plate 37 which can be seen in FIG. 5. The end plate 37 is preferably integrated with the valve housing 4, which is in particular produced as an injection-moulded part.

Figure 5:
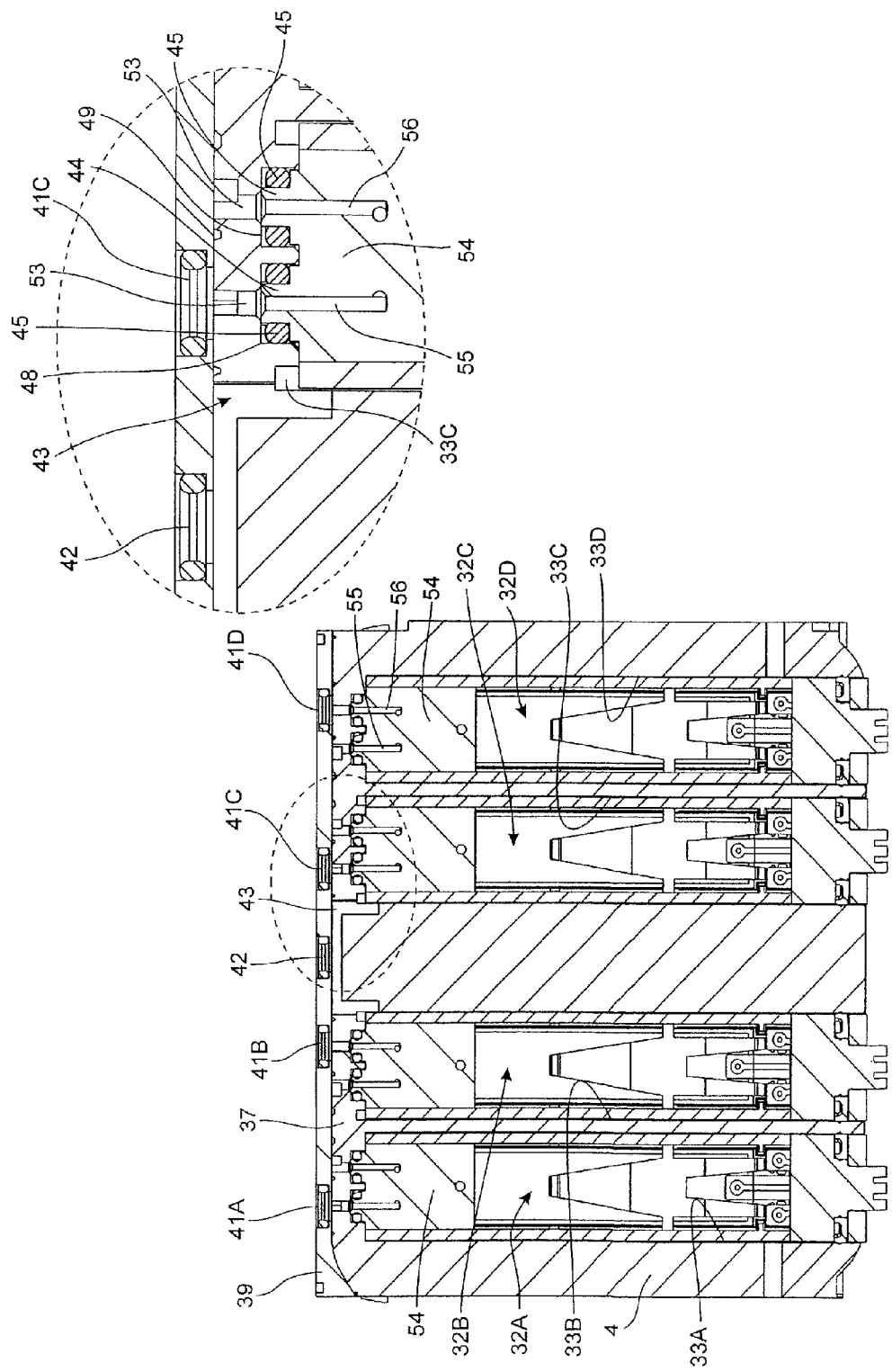
FIG. 5 is a cut top view of the valve housing with the valve cartridges accommodated therein.

The front narrow side 6 of the valve housing 4, which is shown in FIG. 5, is provided with a plurality of groove-like recessed distributor passages 40, which can be identified as distributor passages 40A, 40B, 40C and 40D if required and which are connected in a fluidically communicating manner to openings in the end plates 37, which are not shown in detail. Each of these openings in turn establishes a fluidically communicating connection between the respective distributor passage 40 and one of the valve shafts 33.

In the illustrated embodiment, it is provided that the distributor passages 40A and 40B are connected in a fluidically communicating manner to the valve shafts 22A and 33B without initially taking into account the effects of the valve cartridges 32. It is further provided that that the distributor passages 40C and 40D are connected in a fluidically communicating manner to the valve shafts 22C and 33D without initially taking into account the effects of the valve cartridges 32.

Figure 4:
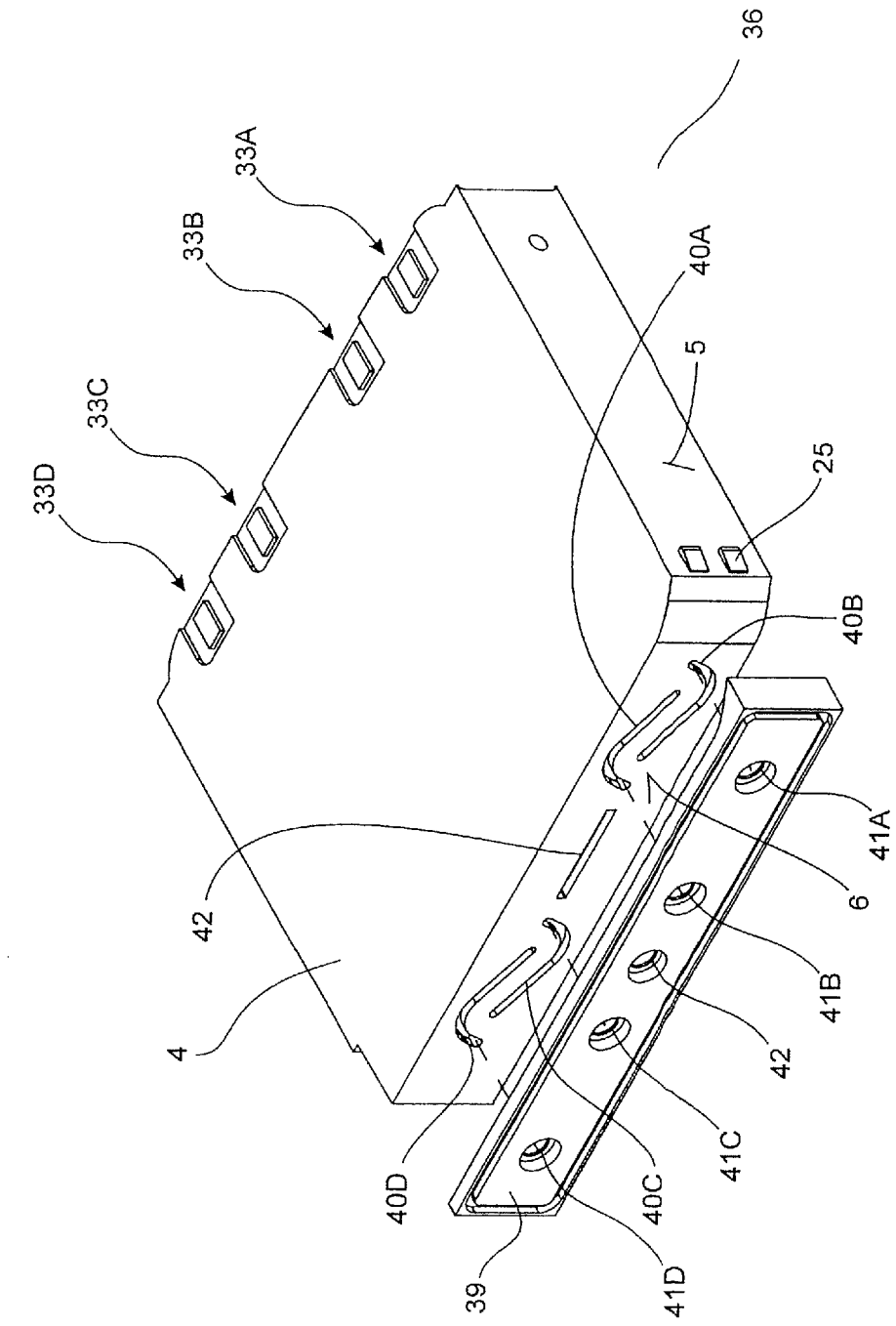
FIG. 4 is a perspective exploded view of the valve housing.

FIG. 4 shows a header plate 39 which, according to FIG. 3, can be mounted on the front narrow side 6 of the valve housing 4 and which is in the illustrated embodiment provided with four operating ports 41, which can be identified as operating ports 41A, 41B, 41C and 41D if required, and with a supply port 42. The header plate 39 can be mounted on the front narrow side 6 of the valve housing 4 to form a seal, thereby ensuring a fluidically communicating connection between a distributor passage 40 and an associated operating port 41. In the same way, a fluidically communicating connection is provided between the supply port 42 and a supply shaft 43 formed in the end plate 37. In the illustrated embodiment, a fluidically communicating connection is provided between the supply shaft 43 and the valve shafts 33B and 33C.

In an embodiment not shown in the drawing, the distributor passages are formed in the header plate together with the operating ports and the supply port. In this way, the end plate of the valve housing can be made simpler, for example featuring only the openings and the supply shaft.

In FIG. 5, it can be seen how the supply shaft 43 of the illustrated embodiment, starting at the supply port 42, terminates into the two valve shafts 33B and 33C. FIG. 5 further shows how the valve cartridges 32 bear against the end plate 37 with a front end region. In the illustrated embodiment, the valve means of the valve cartridges 32 of the valve module 2 are—possibly apart from a preferred valve position to be described in greater detail below (normally open—normally closed)—identical in construction, so that they can in principle be interchanged in any way preferred. Each of the valve cartridges 32 of the illustrated embodiment has at a front end face two outlet ports 44, 45 which project in the manner of cylindrical end pieces from the front end face of the valve cartridges 32. Each of the outlet ports 44, 45 can be provided with a continuous, preferably annular and in particular rubber-elastic, sealing means 47, for example an O-ring. In the illustrated embodiment of the valve cartridges 32 and the valve housing 4, it is provided that two cylindrical recesses 48, 49 are formed on an inner surface 50 of the end plate 37 which faces the respective valve shaft 33. The cylindrical recesses 48, 49 are used for the sealed accommodation of the associated outlet ports 44, 45 and are in turn connected in a fluidically communicating manner to openings 53 which can be seen particularly clearly in the detail of FIG. 5.

Figure 7:
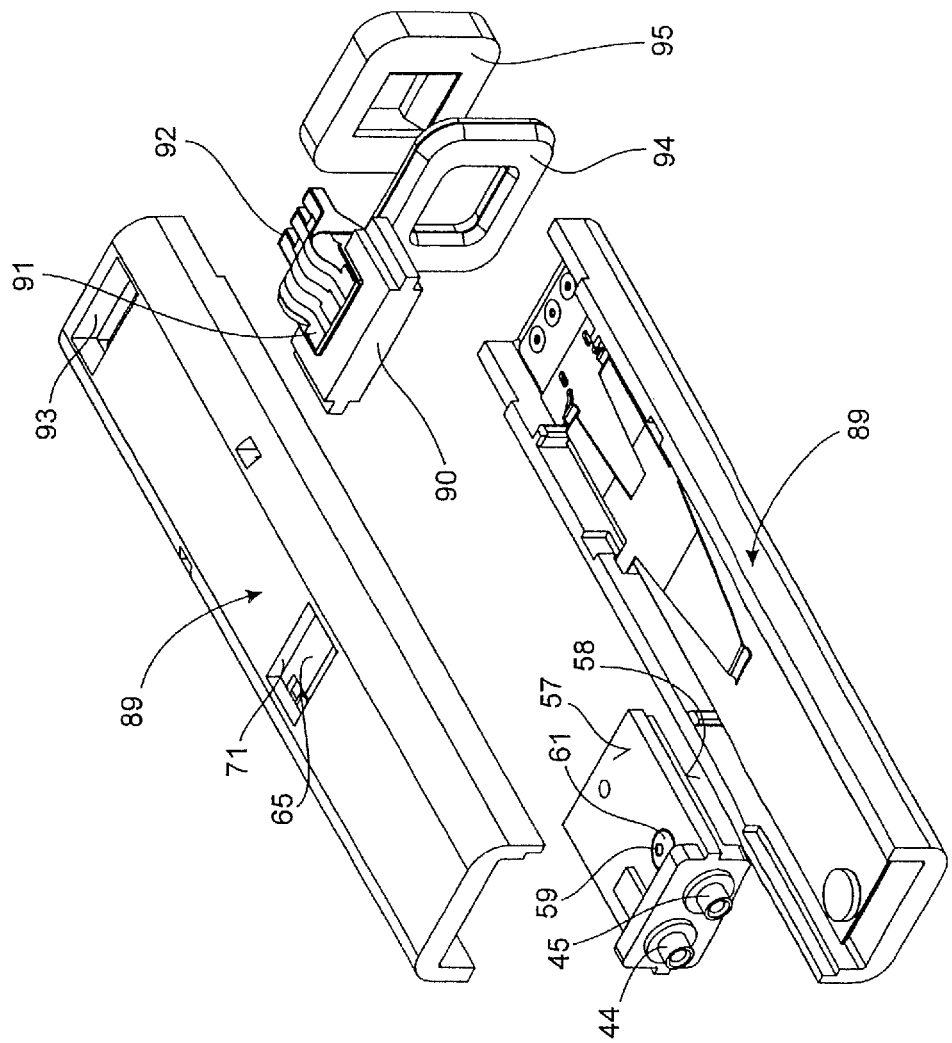
FIG. 7 is a perspective exploded view of the valve cartridge.
Figure 8:
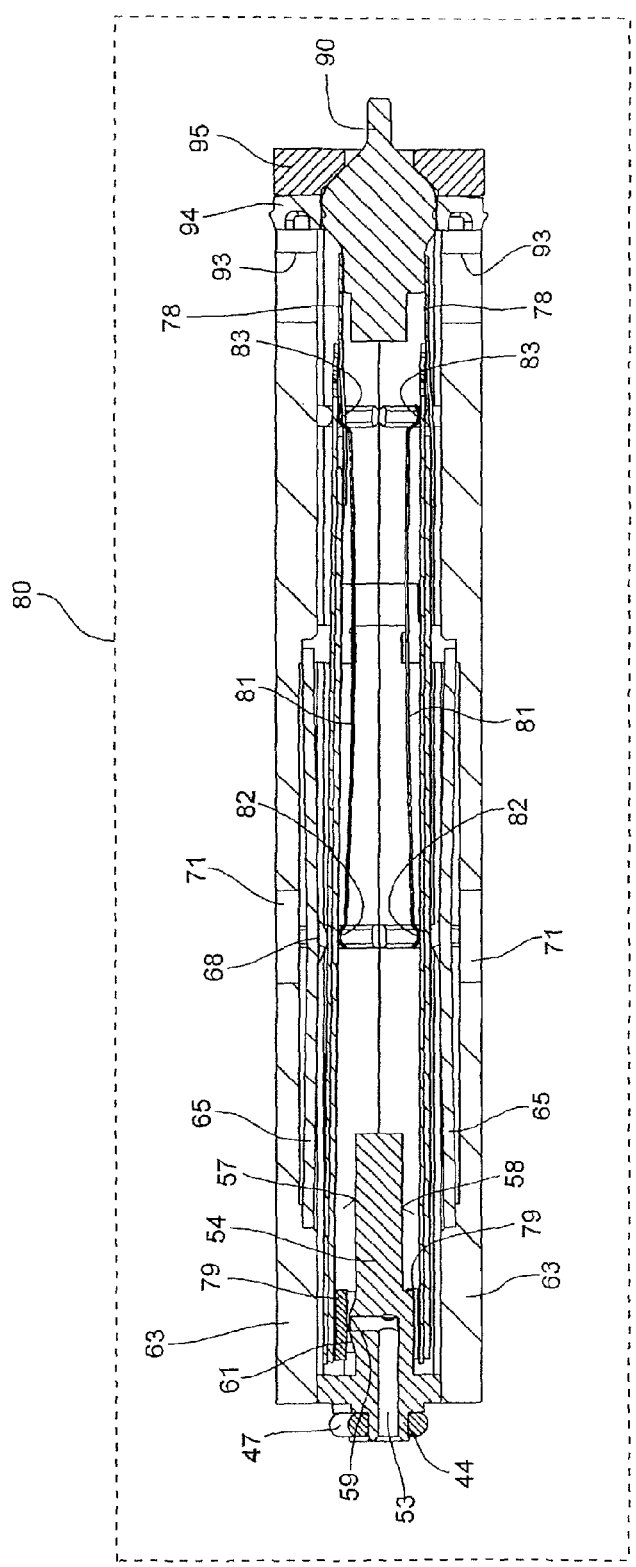
FIG. 8 is a sectional view of the valve cartridge.

In the valve cartridge 32 shown in detail in FIGS. 7 and 8, the outlet ports 44, 45 are integrally formed on a nozzle block 54. The nozzle block 54, which is shown in greater detail in FIG. 7 in particular, has two outlet passages 55, 56, which extend in sections from the outlet ports 44, 45 towards the rear end of the valve cartridge 32 and are then kinked at right angles in opposite directions and terminate at contact surfaces 57, 58 pointing away from one another, as shown in FIG. 8 in particular. The termination apertures 59, 60 of the outlet passages 55, 56 are preferably formed in a valve seat 61, 62 projecting from the respective contact surface 57, 58 and having the shape of a spherical segment in the illustrated embodiment.

Figure 6:
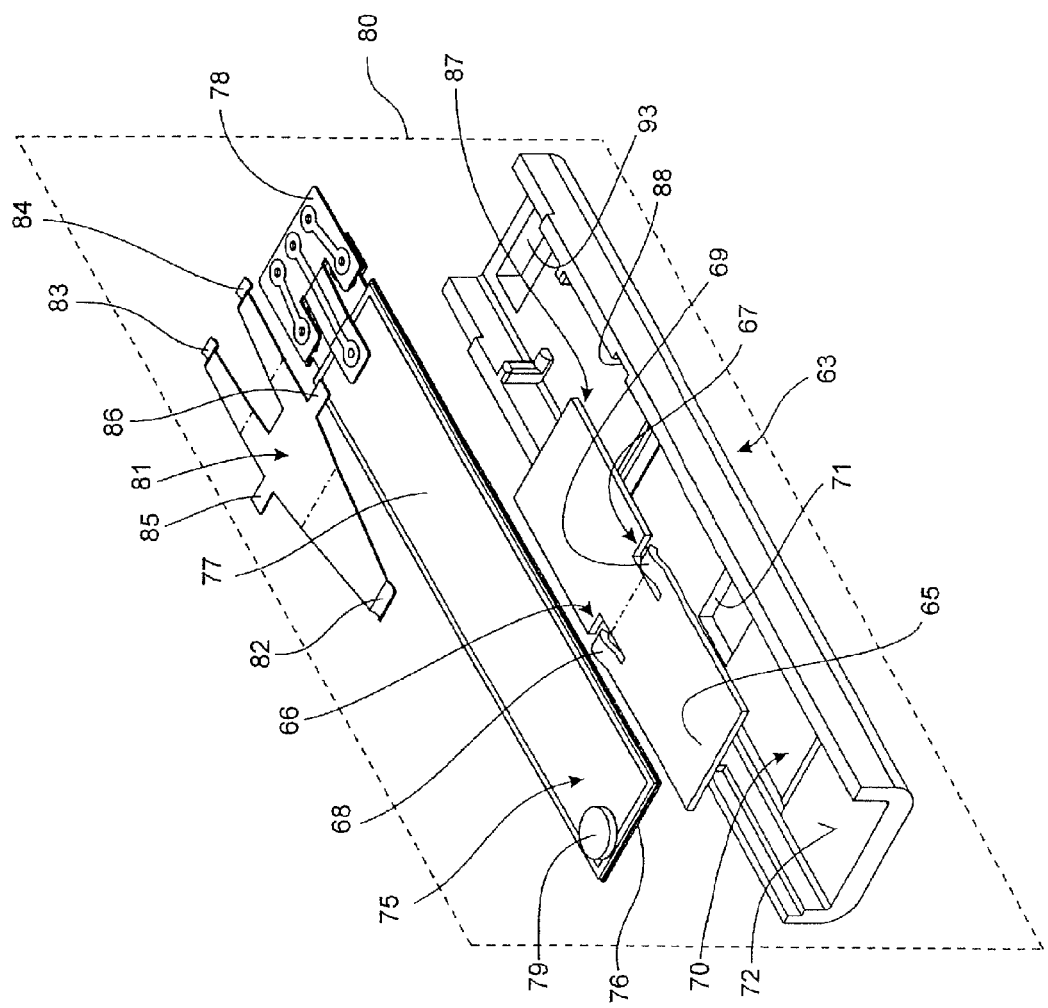
FIG. 6 is a perspective exploded view of a bottom part of the valve cartridge.

The further components of the valve cartridge 32 which can be recognised in FIG. 5 are explained in greater detail in the context of the description of FIGS. 6 to 8. In the illustrated embodiment, the valve cartridge 32 comprises two half-shells 63 which are preferably shaped identically and two individual components accommodated therein and to be described in greater detail at a later point.

FIG. 6 shows one of the half-shells 63, which has a substantially U-shaped cross-section in a cross-sectional plane which is oriented at right angles to the installation axis 36 and is not shown in the drawing. In the production of the valve cartridge 32, a supporting element 65 designed as an adjusting means can be placed in the half-shell 63 in a first step. In the illustrated embodiment, the supporting element 65 is a bent part made of sheet metal, in particular spring steel. The supporting element 65 has a substantially rectangular contour, a material thickness of the supporting element 65 being significantly less than the largest surface of the supporting element 65. In a central section, the supporting element 65 of the illustrated embodiment has two notches 66, 67 which are preferably mirror-symmetric in respect to a mirror axis not shown in the drawing and by which two supporting webs 68, 69 are exposed. These supporting webs 68, 69 are curved in the same direction and project beyond the largest surface of the supporting element 65, which faces the half-shell 63. In the half-shell 63, there is formed a reception shaft 70, which matches the geometry of the supporting element 65, being therefore rectangular in the present case, and in which the supporting element 65 can be accommodated in such a way that only the supporting webs 68, 69 project beyond the inner surface 72 of the lower half-shell 63. In the region of the reception shaft 70, a recess 71 further passes through the half-shell 63 for adjusting the supporting means 65 in a manner to be described in greater detail below.

After the supporting means 65 has been installed into the reception shaft 70, a valve means designed as a piezoelectric bending transducer 75 can be placed in the half-shell 63 in a next assembly step. The bending transducer 75 comprises a substrate 76 which is preferably made of metal and a coating 77 of a piezoelectric material applied to the substrate 76, for example in a laminating process. At a rear end, the bending transducer 75 is mechanically and electrically coupled to a connecting circuit board 78 which is designed to provide an electric voltage to the coating 77 in order to effect a bending of the bending transducer 75 in a movement plane 80. At a front end of the bending transducer 75, which, after its installation into the half-shell 63, remains free to move in contrast to the rear end, a seal 79 having the shape of a cylinder section in the illustrated embodiment is attached to, in particular bonded to, the surface remote from the lower half-shell 63. The seal 79 is preferably made of a rubber-elastic material.

The coating 77 is preferably designed such that it contracts if an electric voltage is applied. In view of the arrangement of the nozzle block 54 relative to the bending transducer 75, an increased curvature is accordingly provided if the coating 77 is applied to the surface of the substrate 76 remote from the half-shell 63 as soon as an electric voltage is applied. The bending transducer 75 installed in this way is therefore a normally open (NO) valve means. For a normally closed valve means, the bending transducer 75 only has to be installed in a mirror-symmetric manner, so that the coating 77 faces the half-shell 63.

After the bending transducer 75 has been placed in the half-shell 63, a leaf spring 81 is placed on the bending transducer 75. The leaf spring 81 comprises a front hold-down 82 and two rear hold-downs 83, 84, all of which are provided to lie on the largest surface of the bending transducer 75. The leaf spring 81 further comprises two locking tabs 85, 86, which project laterally in opposite directions and which are designed for a non-positive latching of the leaf spring 81 in the lower half-shell 63. For this purpose, the half-shell 63 is provided with grooves 87, 88 at its lateral legs for engaging the locking tabs 85, 86 in the assembly process, so that they are latched in the material of the lower half-shell 63. By installing the leaf spring 81, the rear end region of the bending transducer 75 is located on the lower half-shell 63, while the front end region of the bending transducer 75, which supports the seal 79, is brought into a presettable position by introducing a force through the front hold-down 82. The valve cartridge assembly 89 produced in this way is mounted with a second valve cartridge assembly 89, which is identical in the illustrated embodiment, as shown in FIG. 7. In this process, the nozzle block 54 and a contact block 90 are installed between the two valve cartridge assemblies 89.

The contact block 90 has several conductor paths 91, which are electrically connected to plug studs 92. The two valve cartridge assemblies 89 are then connected to one another, preferably by adhesive force, in particular in a welding or bonding process. Next, the electric connections between the connecting circuit boards 78 and the associated conductor paths 91 of the contact block 90 are established in a soldering process, for example using a bow soldering device which can be brought into thermally conductive contact with the connecting circuit boards 78 by means of openings 93 provided for this purpose. In a final step, a seal 94 made of a rubber-elastic material and matched to the cross-section of the valve cartridge 32 and a dimensionally stable seal holder 95 are pushed onto the rear end region of the contact block 90 of the valve cartridge 32. The seal holder 95 has a recess 96 with a free cross-section which is designed such that the seal holder 95 is positively located on the contact block 90 by press-fitting. In addition or as an alternative, the half-shells 63 and the seal holder 90 can be joined by adhesive force, for example by welding or bonding.

In a subsequent step, the function of the assembled valve cartridge 32 can now be tested. In this process, the bending transducers 75 are moved from the neutral position, which is to a great degree determined by the leaf spring 81, into a functional position by applying an electric voltage to the plug studs 92. An adjustment of the bending transducers 75 can be performed before and/or after the functional test. This can for example be achieved by directing a laser beam through the recess 71 onto the surface of the supporting element 65, thereby causing a plastic curvature change of the supporting element 65. This curvature change alters the supporting force introduced into the bending transducer 75 by the supporting element 65, so that the preferred neutral position of the bending transducer 75 can be adjusted.

Figure 10:
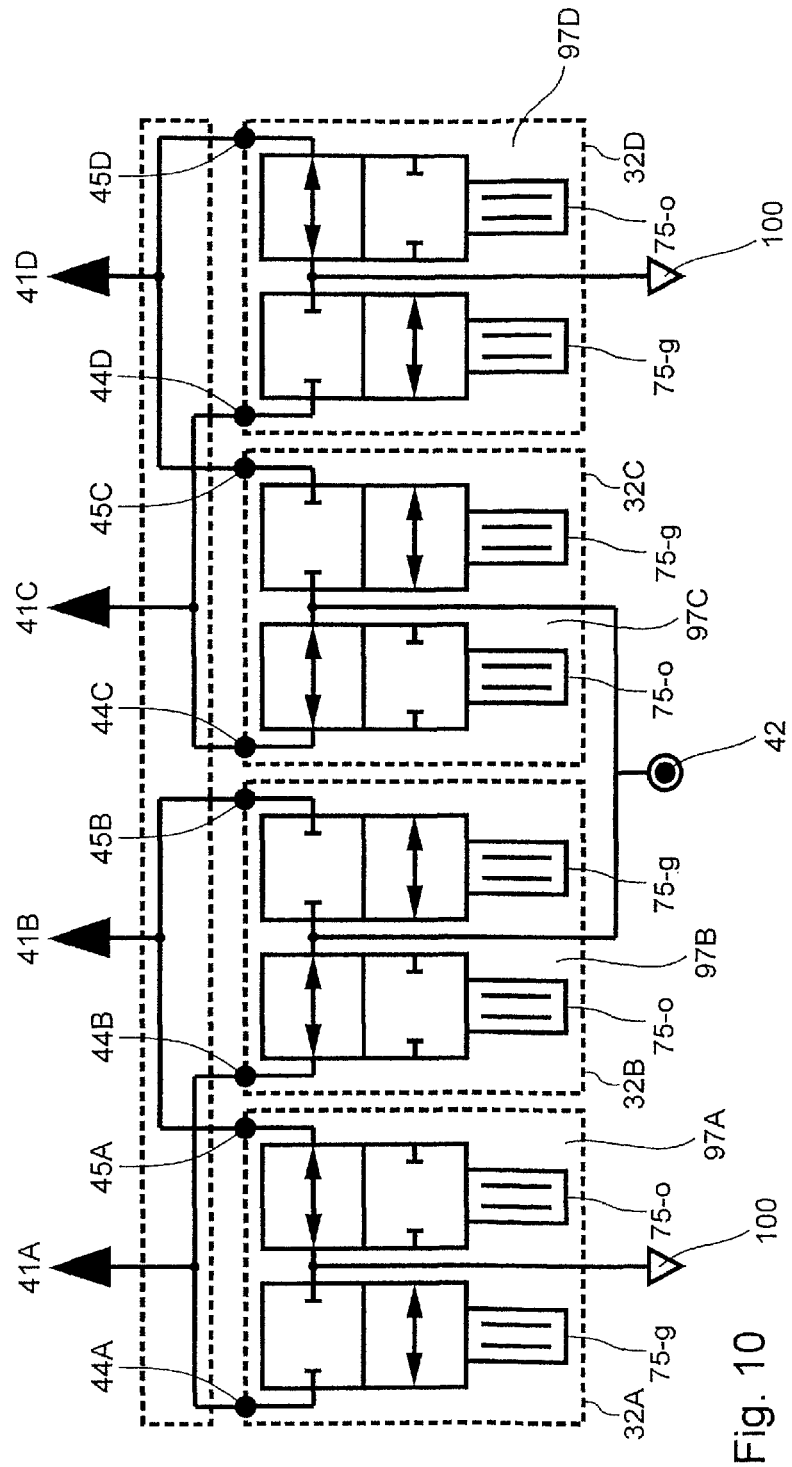
FIG. 10 is a pneumatic diagram for a valve module assembled from a plurality of valve cartridges.

When the assembled valve cartridge 32 is now inserted into the associated valve shaft 33, the sealing contact of the outlet ports 44, 45 in the cylindrical recesses 48, 49 and the sealing contact of the seal 94 on the outer surface of the valve cartridge 32 and the inner surface of the valve shaft 33 define a sealed pressure chamber 97 as shown diagrammatically in FIG. 10.

In the embodiment of a valve module 2 shown in FIGS. 2 and 10, a connection is provided between the supply port 42 and the two internally located valve shafts 33B and 33C. As a result, the respective pressure chambers 97B and 97C can be flooded with a pressurised fluid provided at the supply port 42, and in a pneumatic application the valve means 75 of the valve cartridges 32B and 32C are used as ventilating valves.

Each of the externally located pressure chambers 97A and 97D has in an end region remote from the end plate 37 a discharge passage 100, which is indicated diagrammatically in FIG. 10 and which allows fluid to be discharged from the associated pressure chambers 97A and 97D into the environment. In a pneumatic application, the valve means 75 of the valve cartridges 32A and 32D are used as venting valves.

Figure 9:
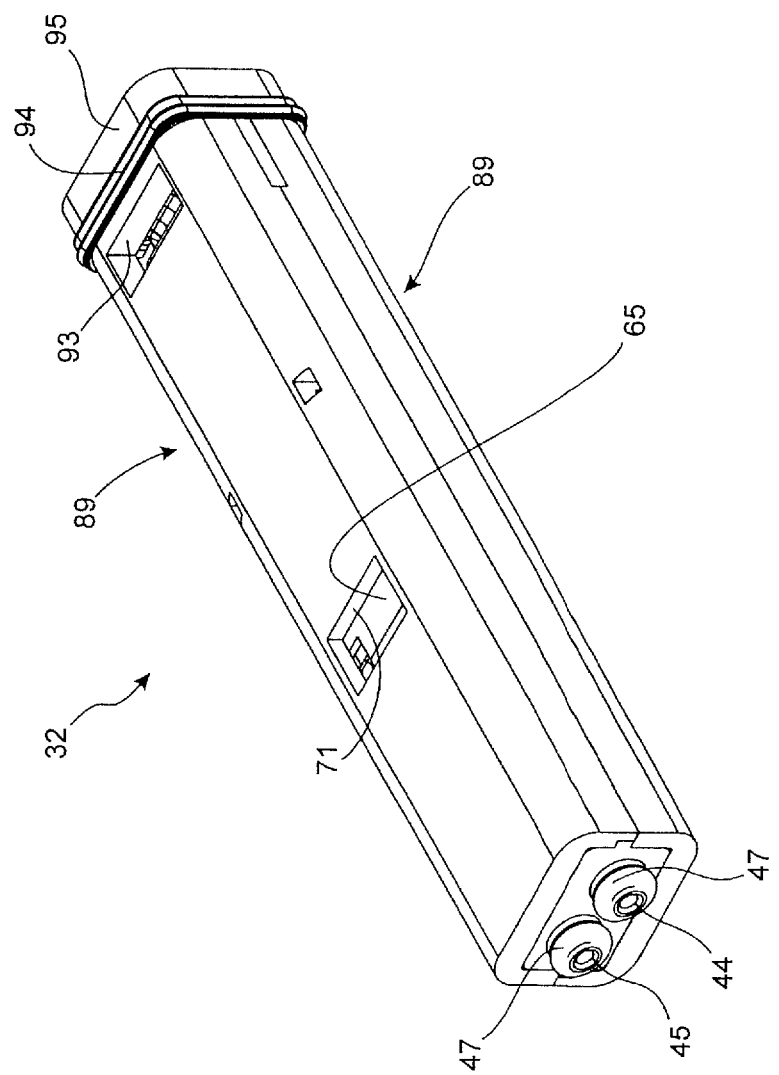
FIG. 9 is a perspective view of the valve cartridge.

FIG. 9 offers an overview of the assembled valve cartridge 32, in which the outlet ports 44, 45 are already provided with the associated sealing means 47 and the seal 94 and the seal holder 95 are pushed onto and located on the rear end of the valve cartridge 32.

By way of example, FIG. 10 shows an advantageous pneumatic interconnection arrangement for the valve cartridge 32. As each of the valve cartridges 32A, 32B, 32C and 32D comprises two bending transducers 75 and each bending transducer 75 is precisely assigned to one of the outlet ports 44A, 44B, 44C, 44D, 45A, 45B, 45C, 45D, pressure can optionally be applied to the operating ports 41A, 41B, 41C and 41D at a first or a second pressure level. In the illustrated embodiment, in each of the valve cartridges 32 there are provided a first bending transducer 75-*g*, which adopts a closed neutral position relative to the associated outlet port 44 or 45 (NC—normally closed), and a second bending transducer 75-*o*, which adopts an open neutral position relative to the associated outlet port 44 or 45 (NO—normally open).

In the case shown in FIG. 10, the outlet ports 45A, 44B, 44C and 45D are open in the neutral position of the bending transducers 75, while the outlet ports 44A, 45B, 45C and 44D are closed in the neutral position of the bending transducers. As the arrangement according to FIG. 10 provides that the valve cartridges 32A and 32D are used as venting valves and designed to discharge pressurised fluid from the respective operating ports 41, the operating ports 41B and 41D are subjected to a venting pressure which may in particular correspond to an ambient pressure for the valve unit 1. In contrast, the supply pressure provided at the supply port 42 is applied to the operating ports 41A and 41C. For this purpose, the bending transducers 75 of the associated valve cartridges 32B and 32C are designed such that a communicating connection between the supply port 42 and the outlet ports 44B and 44C and the associated operating ports 41A and 41C is ensured in the neutral position. In a functional position not shown in the drawing, those bending transducers 75 which are assigned to one of the operating ports 41 are switched, so that for example one or both of the operating ports 41A, 41C can be moved from the ventilating position into a venting position and/or one or both of the operating ports 41B, 41D from the venting position into a ventilating position.

Figure 11:
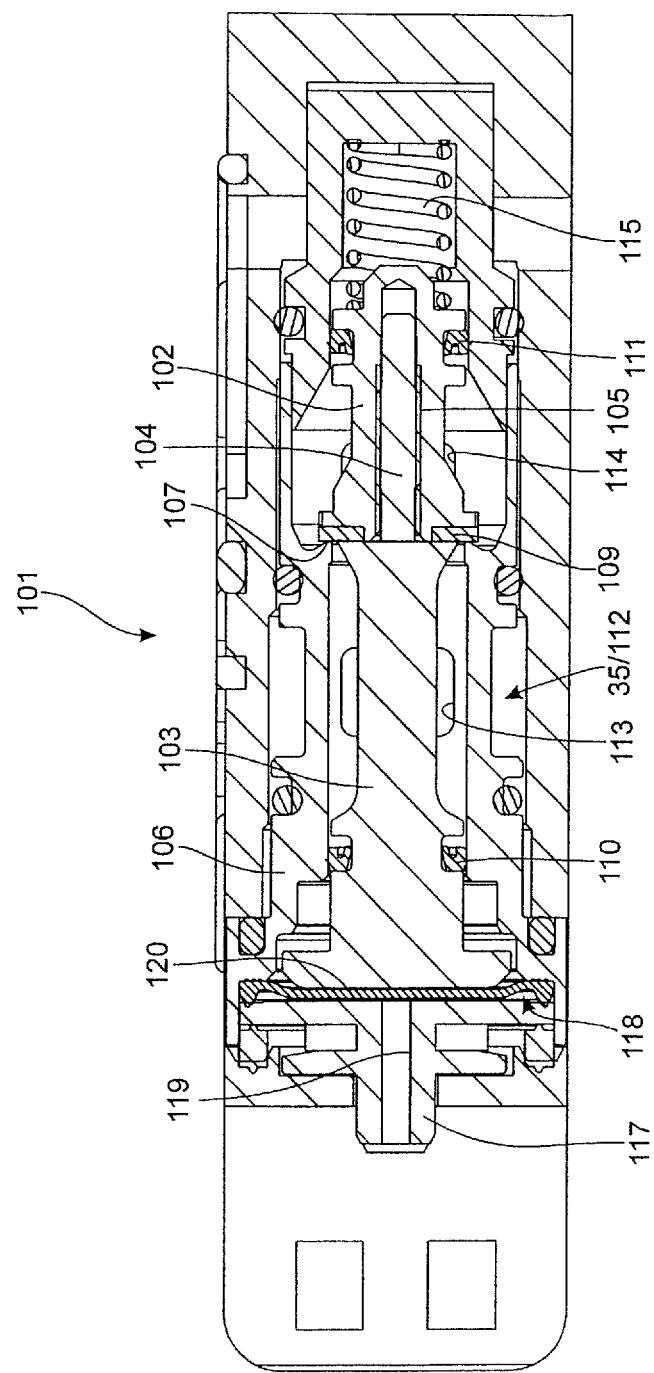
FIG. 11 is a sectional view of a main valve.

The sectional view of a main valve 101 according to FIG. 11 shows the main valve body 34, which is designed in two parts in the illustrated embodiment and which is slidably accommodated in the valve recess 35 of the main valve housing 8. The main valve body 34 comprises a valve member 102 and an actuator 103 which are permanently joined to one another. For this purpose, a threaded section 104 is provided on the actuator 103 and a corresponding threaded blind hole 105 is formed in the valve member 102. The main valve body 34 is slidably guided in a valve insert 106, which is in turn located in the valve recess 35 and which comprises an annular valve seat 107. As the main valve body 34 is used for influencing a free flow cross-section through a flow passage 108 bounded by the valve seat 107, a continuous annular sealing washer 109, which is designed for a sealing contact on the valve seat 107 and thus for blocking the flow passage 108 in the neutral position, is provided between the valve member 102 and the actuator 103. Both the valve member 102 and the actuator 103 of the illustrated embodiment are sealed against the valve insert 106 by a lip seal 110, 111 and therefore define, together with the valve insert 106 and the main valve housing 8, a pressure chamber 112. Via a recess 113, the pressure chamber 112 is connected to a first recess of the group of recesses 15 to 20 according to FIG. 2. Via a recess 114, the pressure chamber 112 is further connected to a second recess of the group of recesses 15 to 20 according to FIG. 2. By the interaction between the valve member 102 and the valve seat 107, a fluidically communicating connection between the recess 113 and the recess 114 along the flow passage 108 can optionally be established or blocked.

A compression spring 115, which in the present case specifies a blocking of the flow passage 108 in the neutral position of the main valve 102, is assigned to the valve member 102 in an end region remote from the actuator 103. The opening of the flow passage 108 requires a translational relative movement of the valve member 2 and the actuator 103 coupled thereto along the central axis 116 of the main valve 101; in this process, the returning force of the compression spring 115 has to be overcome. For this purpose, the actuator 103 is accommodated in a pilot chamber 118 defined by the valve insert 106 and an end plate 117. In the end plate 117, an operating passage 119 is formed through which fluid can be supplied to and discharged from the pilot chamber 118. For an advantageous seal between the pressure chamber 112 and the pilot chamber 118, a sealing membrane 120 is inserted between the valve insert 106 and the end plate 117. If pressure is applied to the pilot chamber 118, the actuator 103 and the valve member 102 coupled thereto are deflected, thereby lifting the sealing washer 109 off the valve seat 107 and opening the flow passage 108 through the pressure chamber 112. The pressurised fluid required for this purpose can for example be made available by one of the operating ports 41 of the valve module 2.

The invention claimed is:

1. A valve device for influencing a fluid supply of fluid-operated loads, the valve device including a valve module comprising:
   a valve housing in which valve shafts are formed, each valve shaft being bounded by an end plate of the valve housing and an inner surface of the valve housing extending from the end plate; and
   a plurality of valve cartridges located in the valve shafts, wherein each valve cartridge comprises at least one port formed at a first end of the cartridge and an annular seal provided at a second end of the cartridge opposite the first end, the at least one port being in sealing engagement with the end plate of a respective valve shaft and the annular seal being in sealing engagement with the inner surface of the respective valve shaft to form a pressure chamber connected to an assigned inlet port in a fluidically communicating manner, and wherein each of the valve cartridges comprises two electrically selectable valve means which are designed to influence a free flow cross-section between the pressure chamber and an outlet port assigned to the respective valve means, and
   wherein each valve shaft has a geometry substantially corresponding to an external geometry of each of the valve cartridges for fully receiving one valve cartridge therein such that each valve cartridge is substantially enclosed within a respective valve shaft.

2. A valve device according to claim 1, wherein the two electrically selectable valve means in each of the valve cartridges are movable in a common movement plane between a blocking position and a release position for influencing the respective free flow cross-section to the associated outlet port.

3. A valve device according to claim 1, wherein an operating port, which is formed on the valve housing and which is designed for a fluidically communicating connection to a fluid-operated load, is connected in a fluidically communicating manner to an outlet port of a first valve cartridge and to an outlet port of a second valve cartridge for optionally establishing at the operating port a fluidically communicating connection to the pressure chamber of the first or the second valve cartridge.

4. A valve device according to claim 1, wherein each of the two electrically selectable valve means has a first end region located on the valve cartridge and a second end region which is freely movable and which is designed for a sealing contact with a valve seat in the blocking position and for releasing the valve seat in the release position, wherein the valve seat is designed as a terminating orifice of an outlet passage which terminates into the pressure chamber and is connected to an outlet port.

5. A valve device according to claim 4, wherein the two electrically selectable valve means are designed as piezo-electric bending transducers.

6. A valve device according to claim 5, wherein the bending transducer lies, at a distance from the first end region, on an adjusting means which is supported on each of the valve cartridges and which is designed for setting a preferred position of the freely movable end region of the bending transducer in the movement plane.

7. A valve device according to claim 6, wherein the adjusting means has in the movement plane a curvature which can be adjusted for adjusting the preferred position of the freely movable end region of the bending transducer by local energy supply by means of an energy beam.

8. A valve device according to claim 5, wherein a spring means for providing a pressing force acting on the adjusting means in the movement plane is assigned to the bending transducer.

9. A valve device according to claim 1, wherein the outlet ports are located on a front end face of each of the valve cartridges and/or wherein, adjacent to a rear end face of each of the valve cartridges, a continuous sealing element is formed for the sealed accommodation of each valve cartridge in each valve shaft.

10. A valve device according to claim 1, wherein a contact device, which is designed for an electric connection with the electrically selectable valve means is located on a rear end face of the valve cartridge.

11. A valve device according to claim 1, wherein two each of the valve cartridges are fluidically connected to form two 3/3-way valves.

12. A valve device according to claim 1, wherein a main valve module has at least one fluidically selectable main valve which comprises a valve member movably accommodated in a valve chamber and an actuator coupled to the valve member and movably accommodated in a pilot chamber, wherein the pilot chamber is connected to an operating port of the valve module and a position of the actuator and the valve member coupled thereto is adjustable as a function of a pressure applied to the pilot chamber, in order to adjust a free flow cross-section in the valve chamber by means of the valve member.

13. A valve device according to claim 12, wherein a spring device is assigned to the valve member and/or to the actuator in order to provide a spring force for determining a preferred position of the valve member in the valve chamber.

14. A valve device according to claim 12, wherein one valve module and one main valve module each form a valve unit which can be lined up along a line-up axis with an adjacent valve unit with its largest outer surface, wherein at least one recess extending along the line-up axis passes through the valve unit to form a fluid passage.

15. A valve device according to claim 14, wherein at least one contact means designed for an electric connection of the valve module and/or the main valve module to an electronic selection circuit and/or to an electronic control unit projects at a narrow side of the valve unit.

16. A valve device for influencing a fluid supply of fluid-operated loads, comprising a valve module with a valve housing in which valve shafts are formed to accommodate valve cartridges, and further comprises valve cartridges located in the valve shafts, wherein each of the valve shafts together with the valve cartridges accommodated therein bounds a pressure chamber connected to an assigned inlet port in a fluidically communicating manner, and wherein each of the valve cartridges comprises:
   a housing;
   a first outlet formed at a proximal end of the housing;
   a first electrically selectable valve means having a fixed end fixed at a distal end of the housing opposite the proximal end and further having a deflectable end opposite the fixed end for sealing engagement with said first outlet, said first electrically selectable valve means being configured for electrical and mechanical actuation to alternatively seal and open said first outlet;
   a second outlet formed adjacent to said first outlet at said proximal end of the housing; and
   a second electrically selectable valve means having a fixed end fixed at the distal end of the housing opposite the proximal end and further having a deflectable end opposite the fixed end for sealing engagement with said second outlet, said second electrically selectable valve means being configured for electrical and mechanical actuation to alternatively seal and open said second outlet.

17. A valve device according to claim 16, wherein each of the first and second electrically selectable valve means is a piezoelectric bending transducer.

* * * * *